April 27, 1965  R. A. MAHAFFY ET AL  3,180,066
PACKAGING APPARATUS
Filed July 31, 1962  11 Sheets-Sheet 1
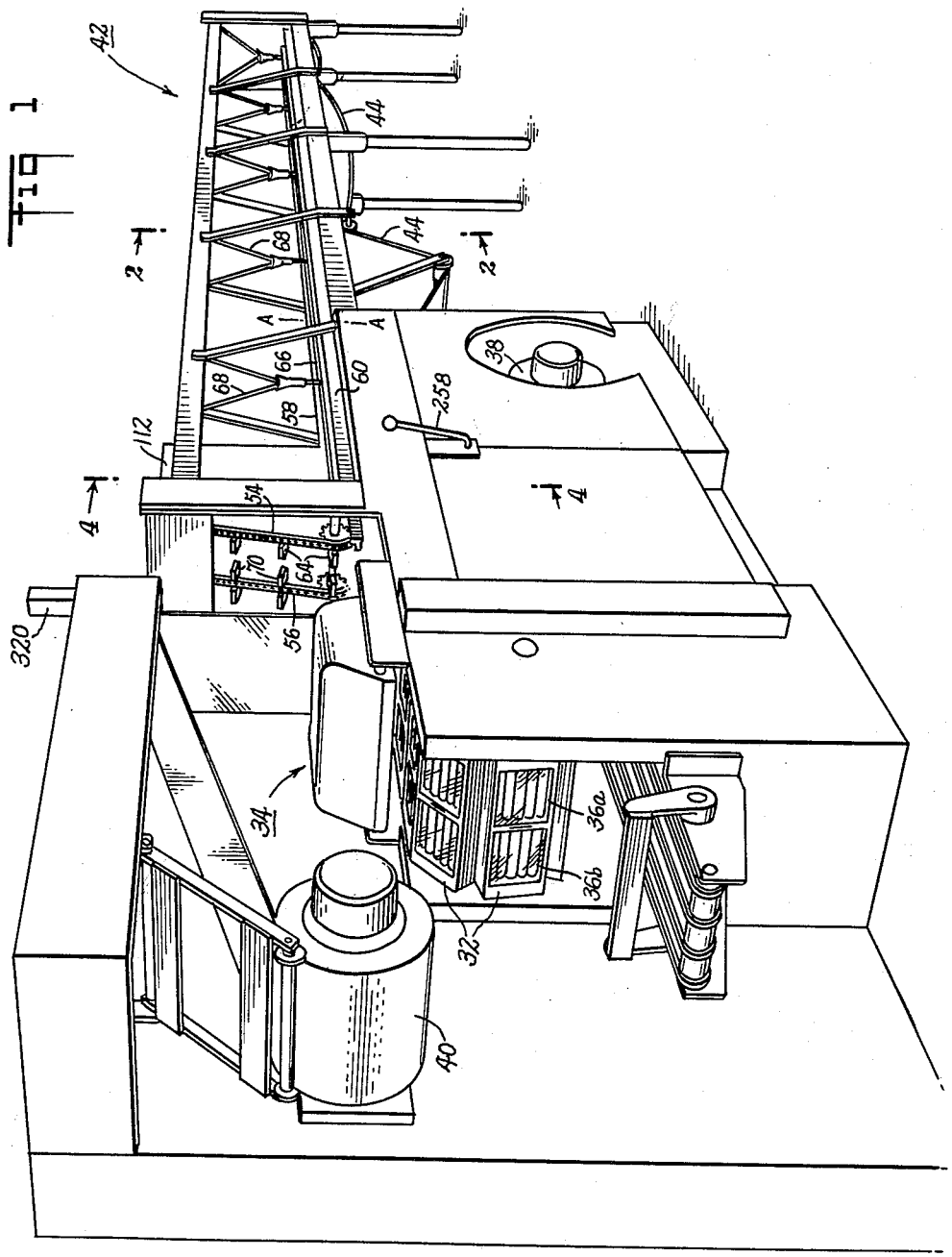
INVENTORS
REID A. MAHAFFY
JOHN R. HARDER
BY
Curtis Morris & Safford
ATTORNEYS

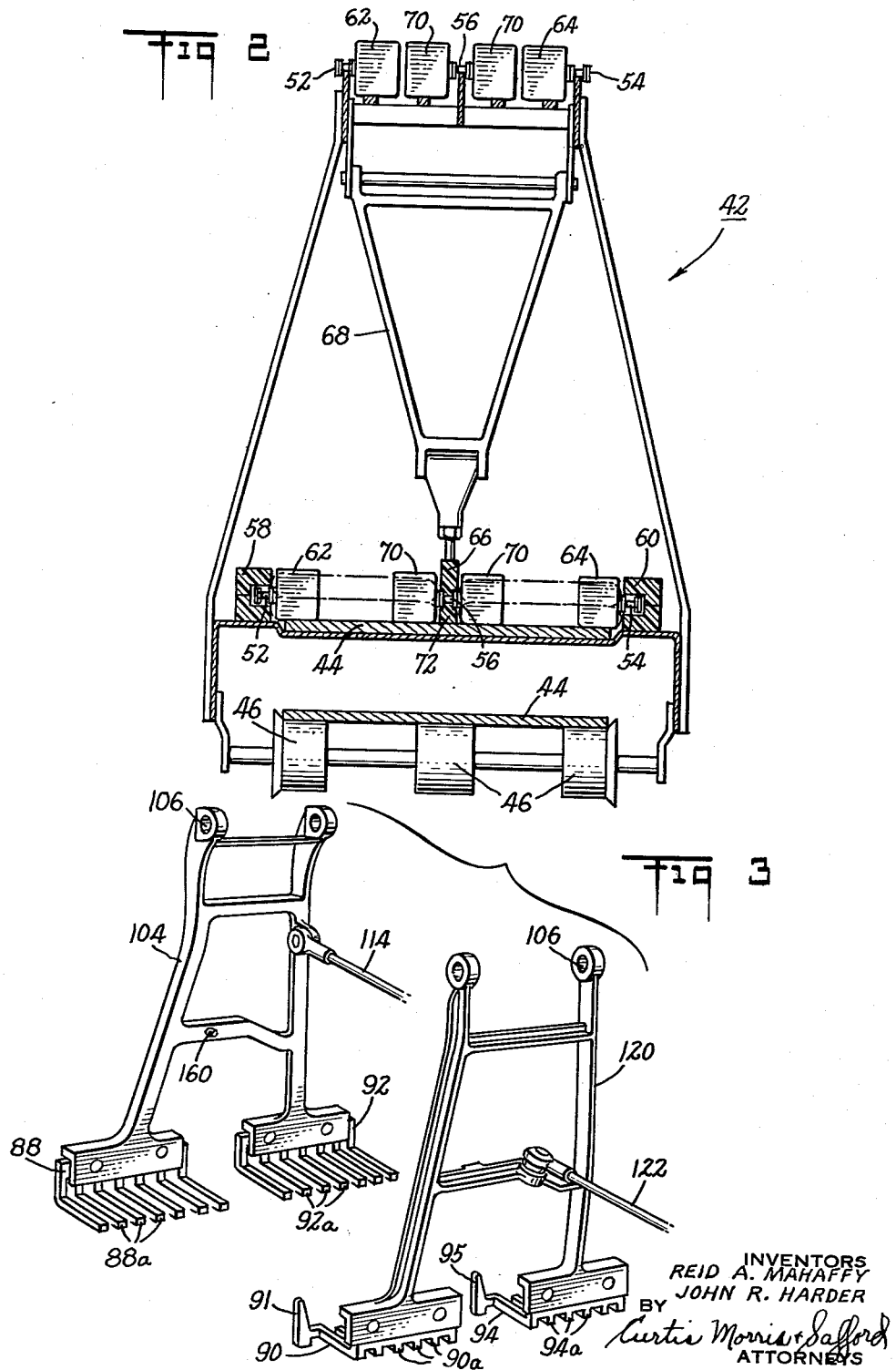

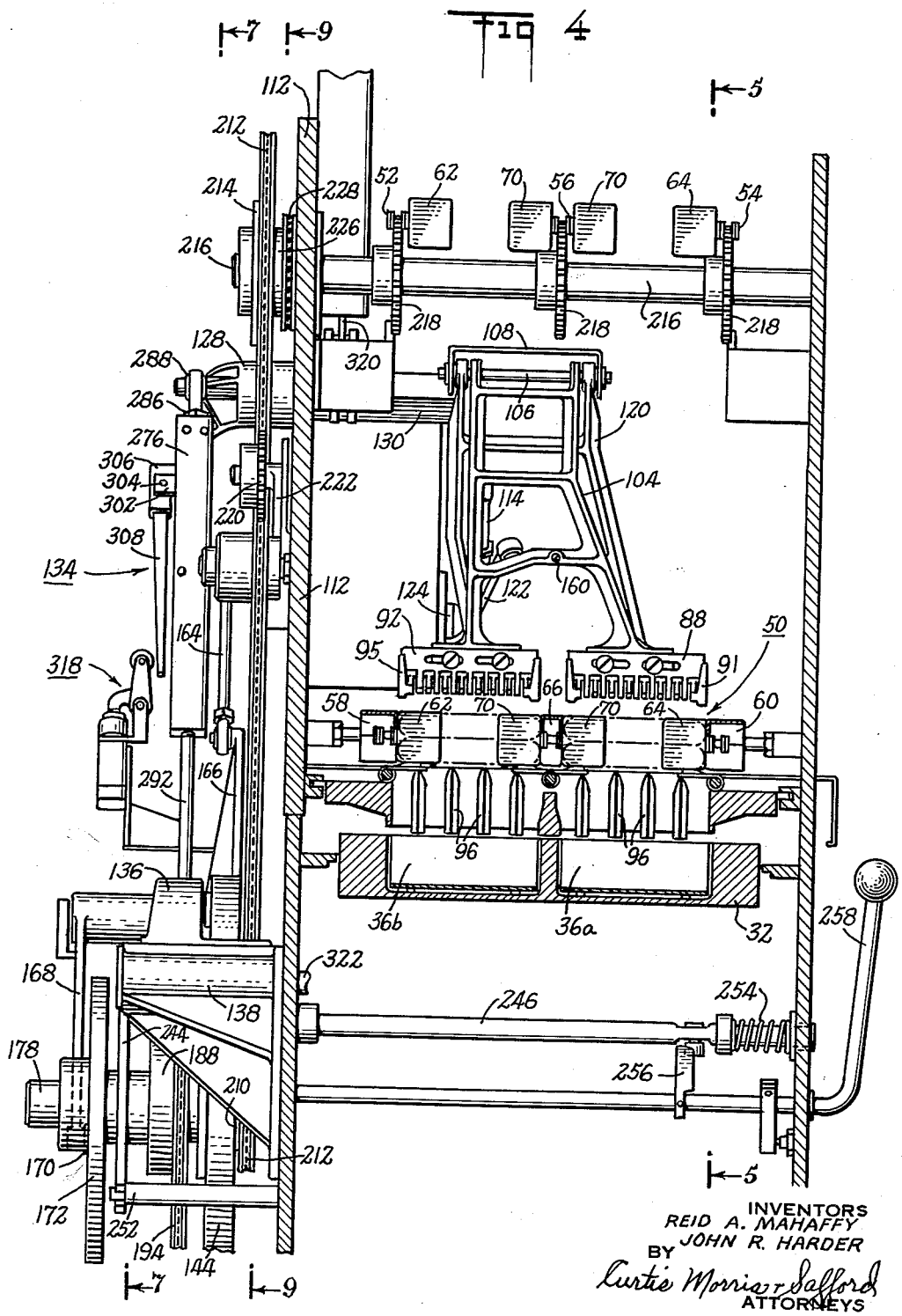

April 27, 1965  R. A. MAHAFFY ET AL  3,180,066
PACKAGING APPARATUS
Filed July 31, 1962  11 Sheets-Sheet 4
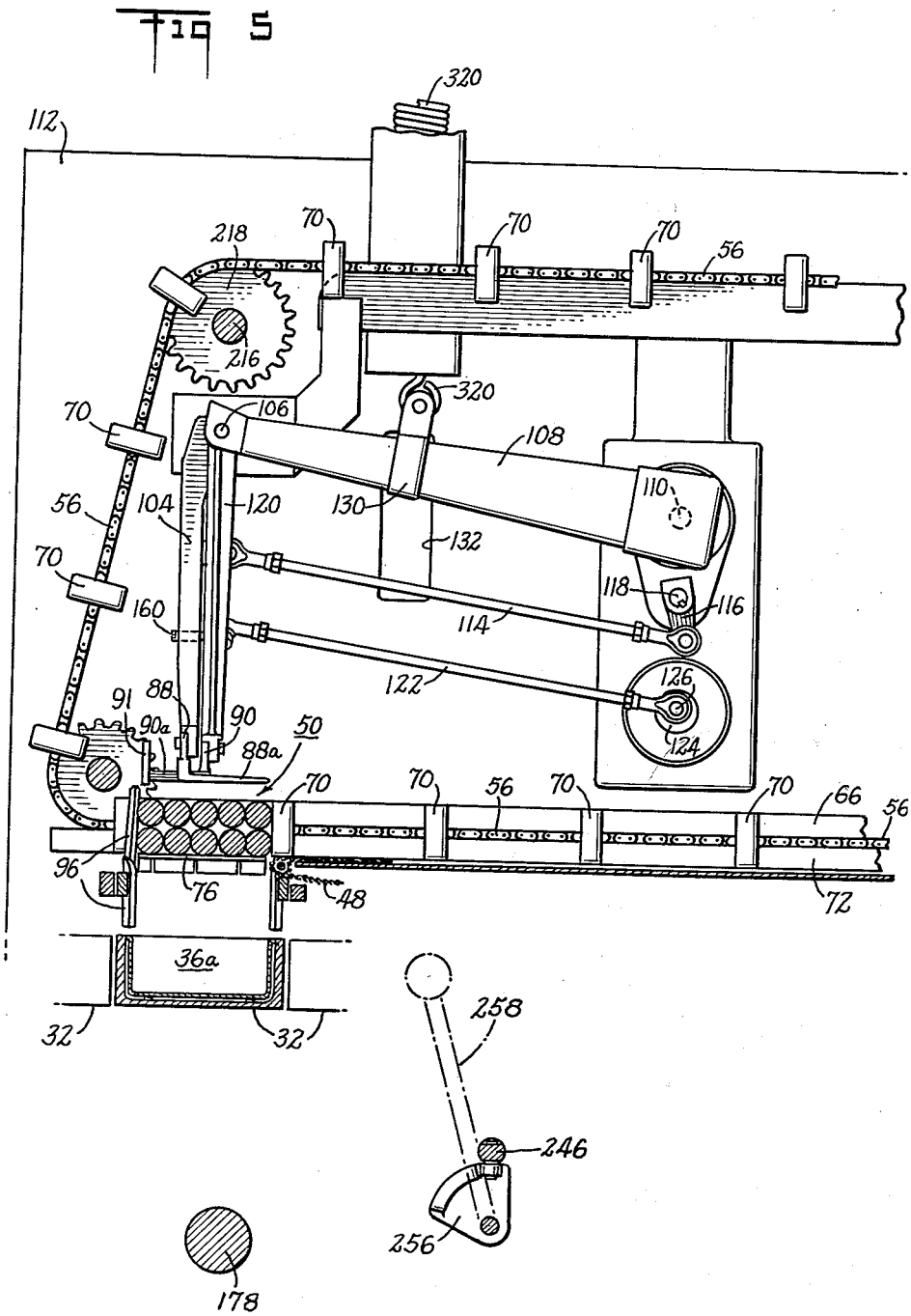
INVENTORS
REID A. MAHAFFY
JOHN R. HARDER
BY
Curtis Morris & Safford
ATTORNEYS

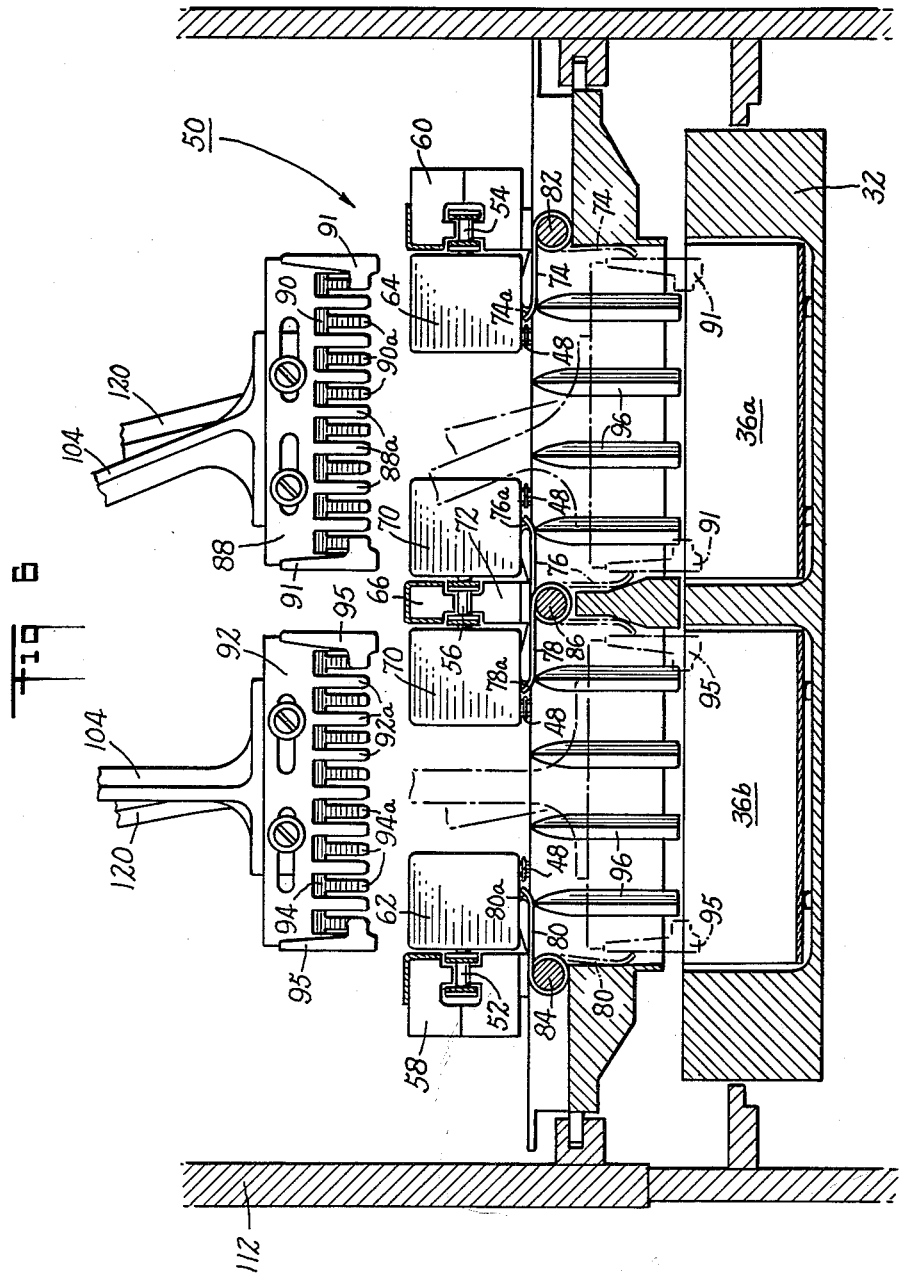

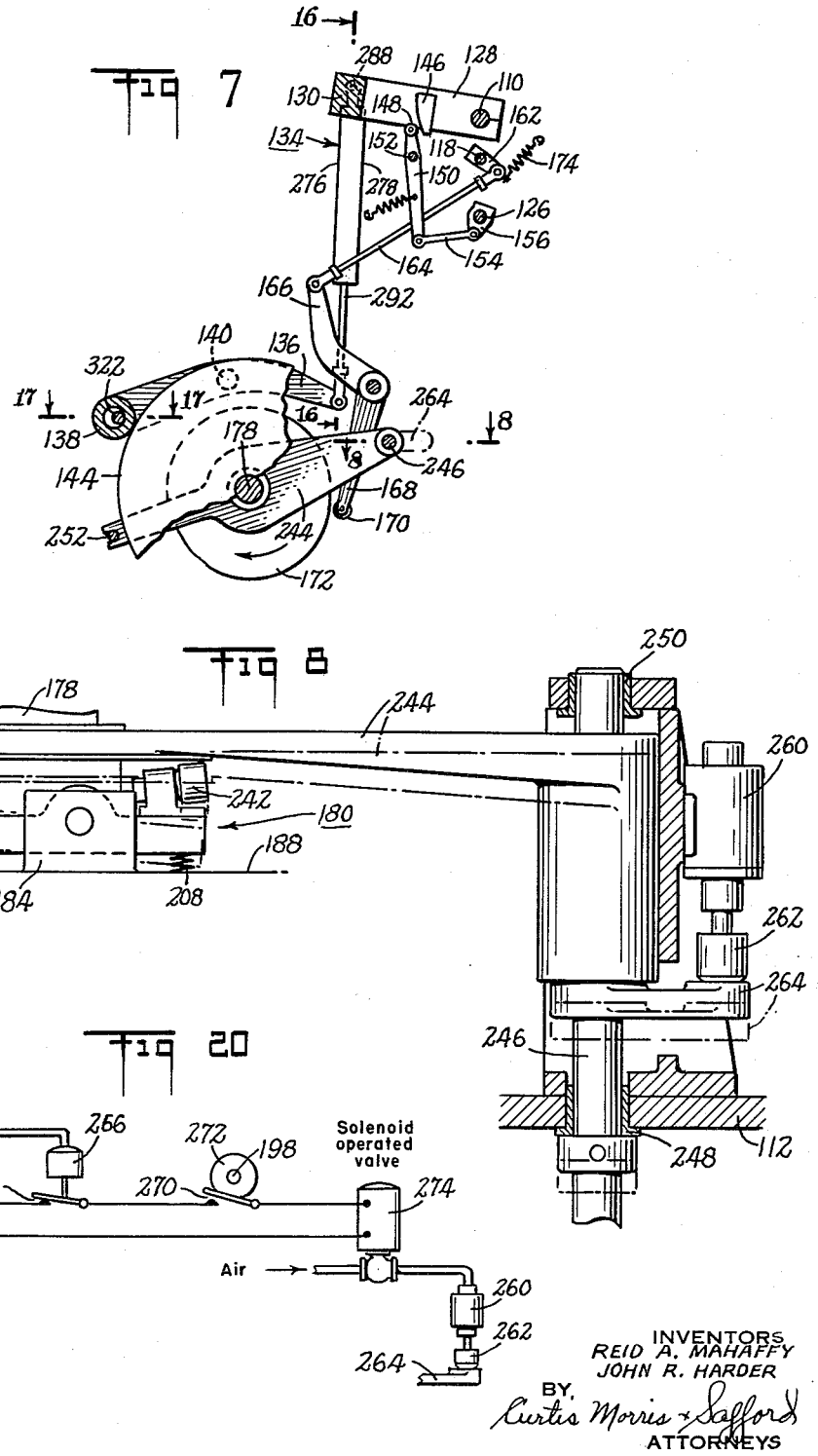

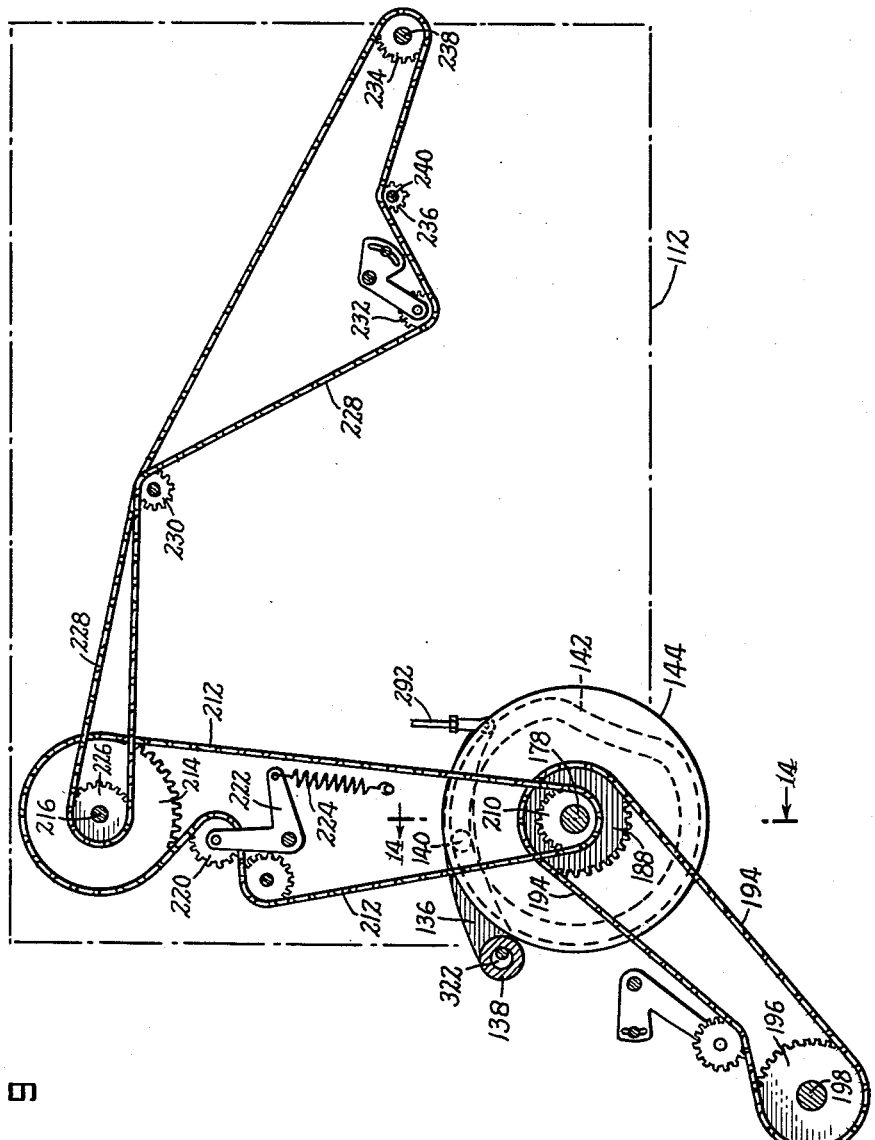

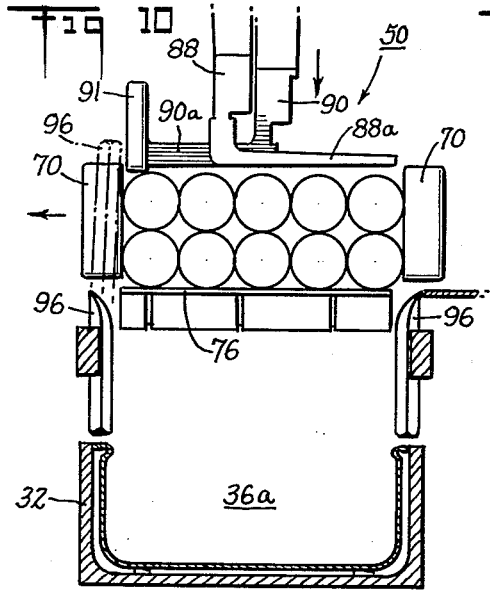
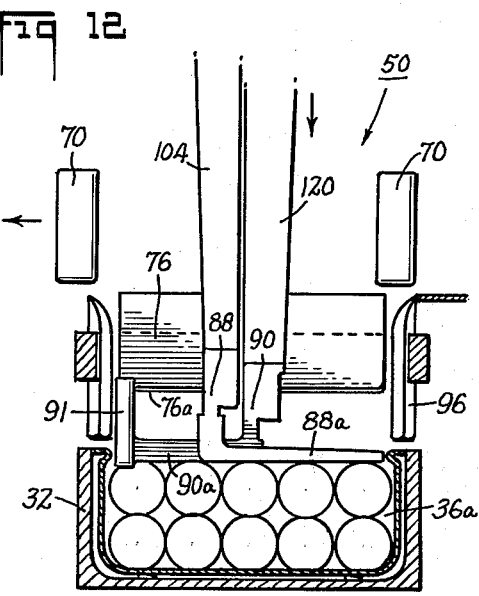
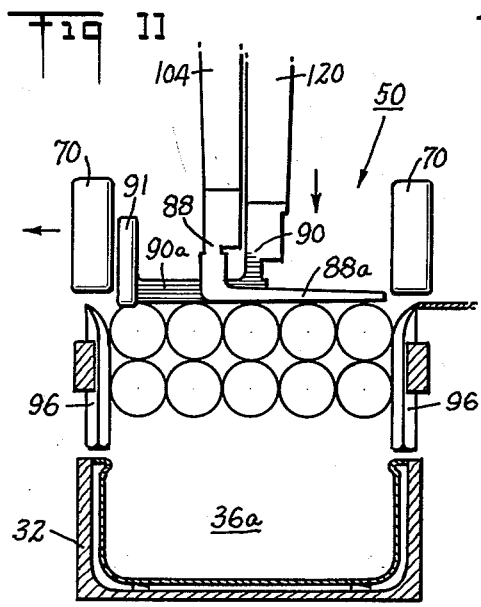
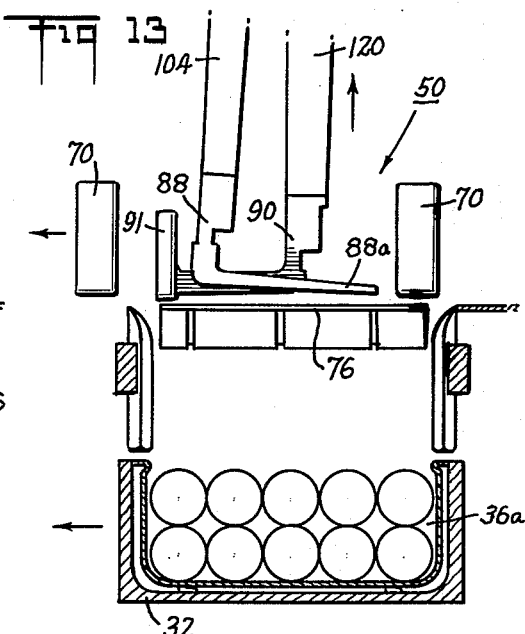

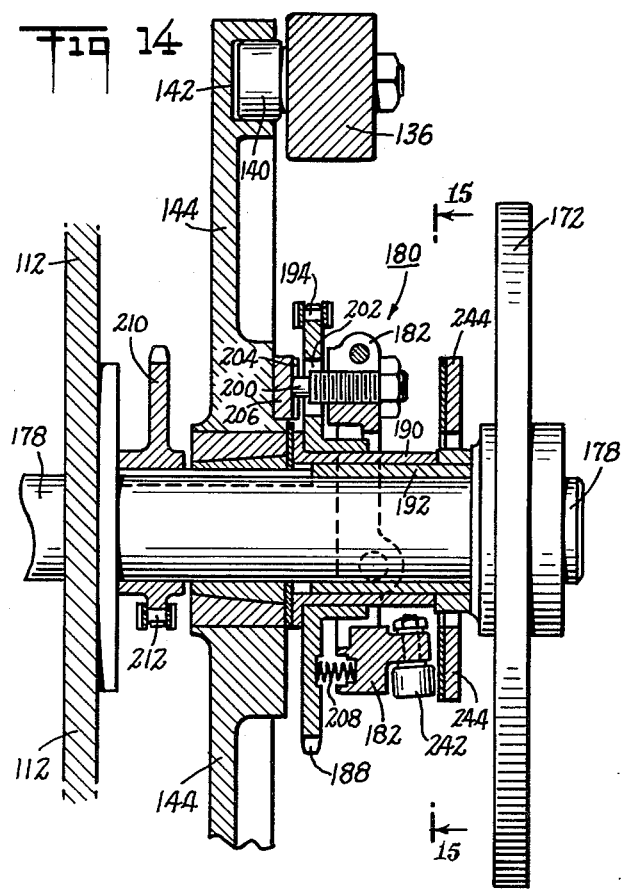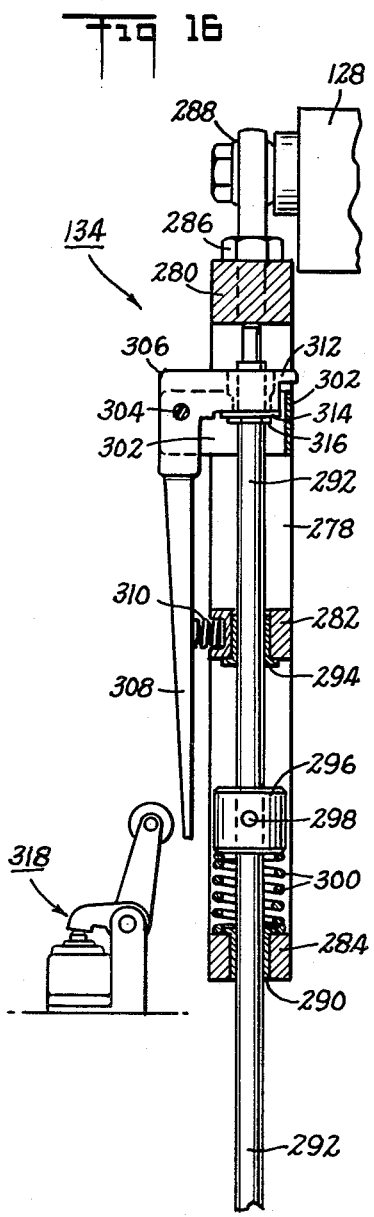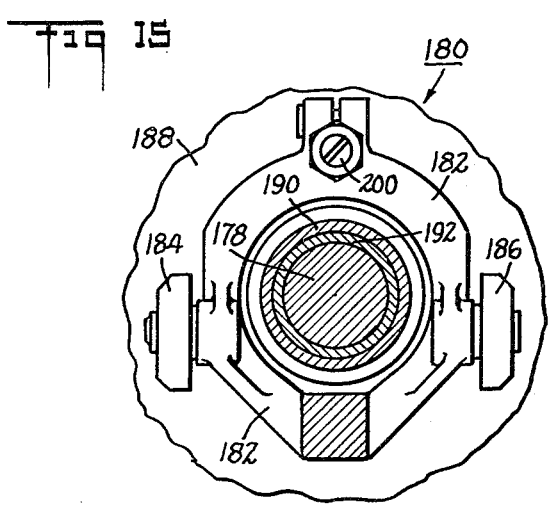

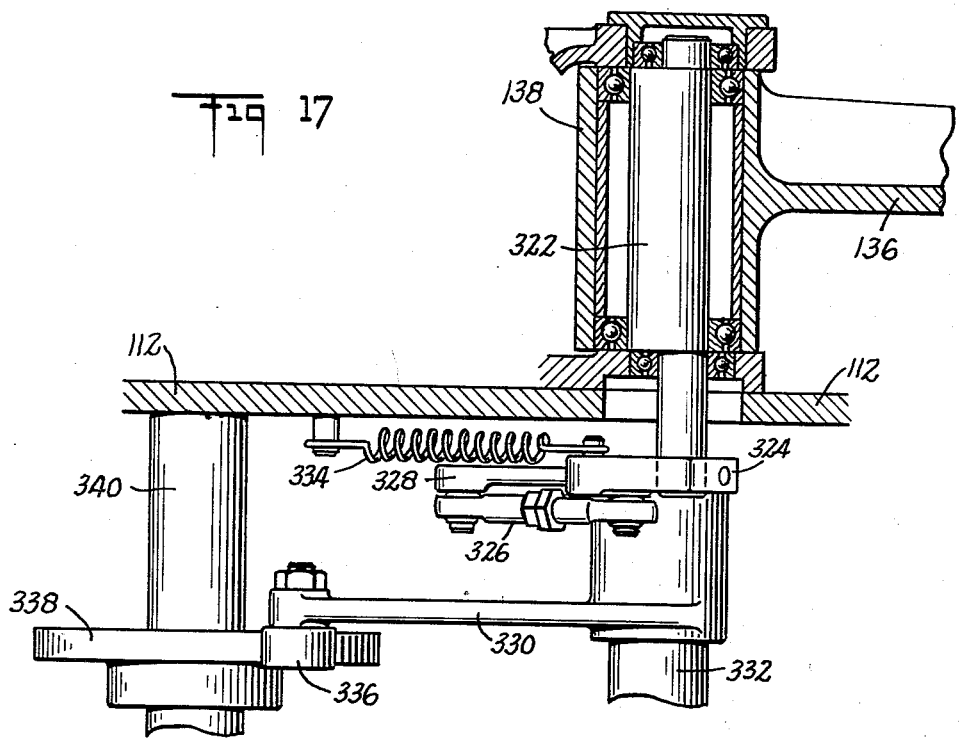
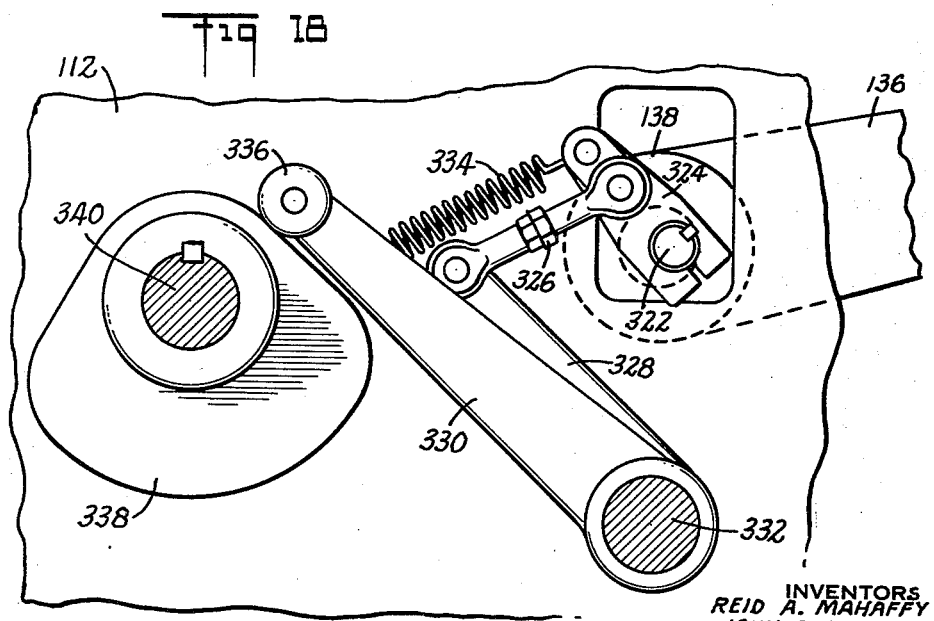

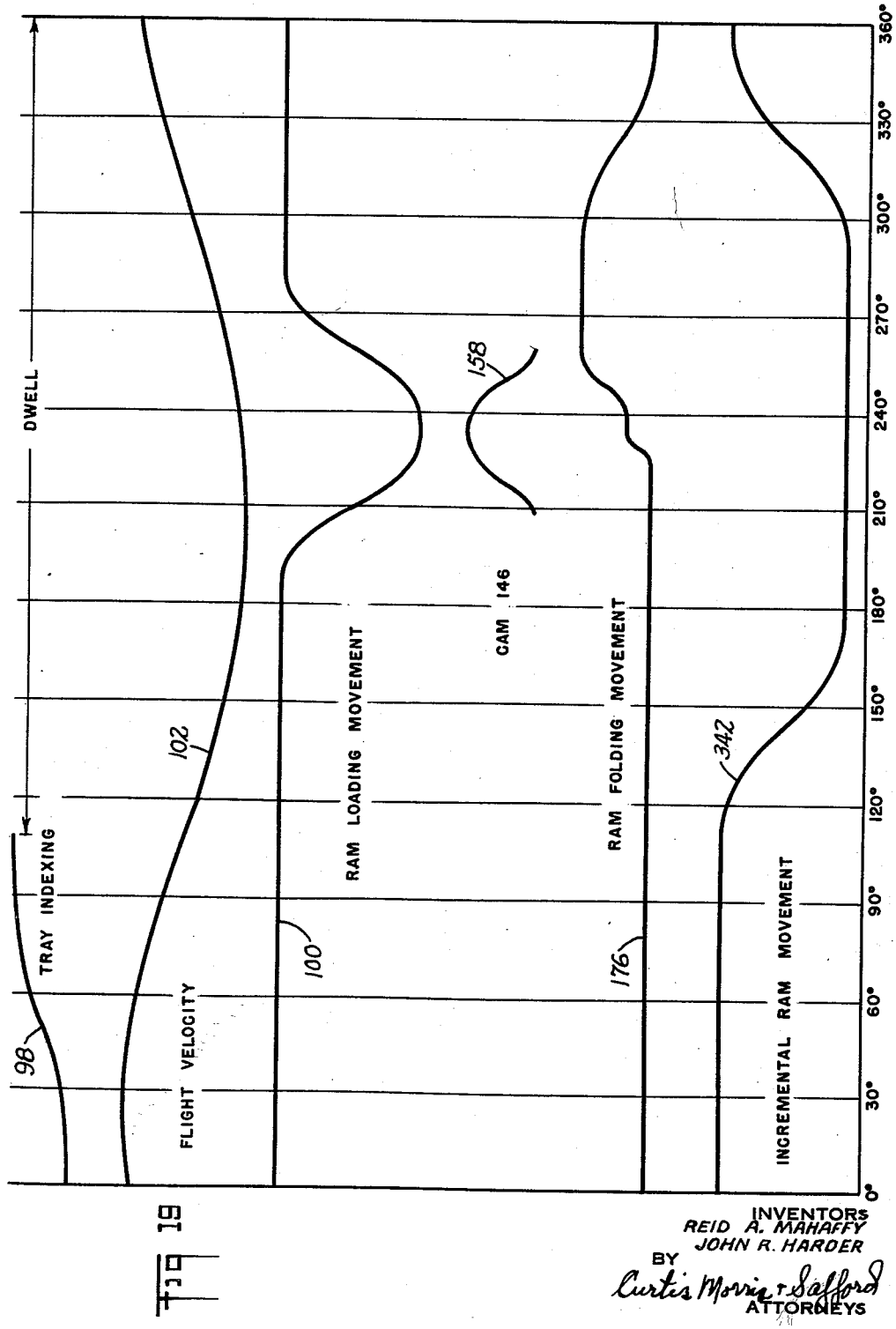

3,180,066
PACKAGING APPARATUS
Reid A. Mahaffy, 105 Clinton Ave., Montclair, N.J., and John R. Harder, 101 Cedar Grove Parkway, Cedar Grove, N.J.
Filed July 31, 1962, Ser. No. 213,705
38 Claims. (Cl. 53—52)

This invention relates to packaging machines and methods of packaging. More in particular, this invention relates to means for loading products, such as frankfurters, luncheon meat or the like, into movable receptacles wherein the products are to be packaged.

Automatically-operable packaging machines have been in use commercially for a number of years for packaging a wide variety of products and articles. A particularly successful packaging machine is disclosed in copending application Serial No. 842,365, filed by Reid A. Mahaffy on September 25, 1959, now Patent No. 3,061,984. This machine automatically converts continuous sheets of flexible and stretchable plastic packaging material into sealed and evacuated (or gas-filled) packages containing the product. To accomplish this objective, the machine comprises a plurality of movable receptacles, e.g., an endless chain of interconnected trays each having a pair of receptacles, which are shifted past a series of packaging stations where successive operations are carried out to form the completed package.

Experience has shown the need of providing improved means for loading the products into the receptacles of such packaging machines. Not only is it desirable to provide more efficient and faster loading means in order to take full advantage of the high speed operation of the packaging machine, but it also is important to provide loading apparatus particularly arranged to fit the products snugly into the receptacles, thereby to effect a more attractive package appearance and to minimize the amount of packaging material required. In addition, there is a special loading problem where groups of products, such as frankfurters, are to be packaged together, since the loading apparatus should provide for collation of the products into the desired grouping, and also should avoid disarrangement of the group during the transfer to the packaging machine receptacle.

Accordingly, it is an object of this invention to provide improved methods and apparatus for loading products into packages. A more specific object of the invention is to provide methods and means whereby solid articles, such as blocks of compressed, congealed or frozen food, can be transferred automatically and at high speeds in a generally downward direction into package portions or other receptacles without change in orientation of the articles, i.e., without tumbling or other disarrangement. A still further object of the invention is to provide such apparaus which is economical to manufacture and which is so arranged as to minimize the chance of damage to the equipment due to malfunction during operation. Yet another object of the invention is to provide means for preventing the loading of products into defective packages. Other objects, advantages and aspects of the present invention will be in part pointed out in, and in part apparent from, the following description considered together with the accompanying drawings, in which:

FIGURE 1 is a perspective view of a packaging machine including loading apparatus in accordance with the present invention;

FIGURE 2 is a vertical section taken along line 2—2 of FIGURE 1 to show certain aspects of the infeed conveyor system;

FIGURE 3 is a perspective view of the loading rams;

FIGURE 4 is a vertical section taken along line 4—4 of FIGURE 1 and presenting an end view of the loading rams as well as certain portions of the loader drive mechanism;

FIGURE 5 is a vertical section taken along line 5—5 of FIGURE 4, looking towards the rear of the machine;

FIGURE 6 is an enlarged detail view of the loading rams shown in FIGURE 4;

FIGURE 7 is a vertical section taken along line 7—7 of FIGURE 4 and showing the cam-controlled drive mechanism for the loading rams;

FIGURE 8 is a horizontal section taken along line 8—8 of FIGURE 7 and showing the mounting for the clutch-release lever;

FIGURE 9 is a vertical section taken along line 9—9 of FIGURE 4 showing the chain and sprocket power transmission system for the infeed conveyor and the loading rams;

FIGURES 10 through 13 are detail vertical sections showing successive positions of the loading rams and other associated parts during a typical loading operation;

FIGURE 14 is a vertical section taken along line 14—14 of FIGURE 9 and showing details of the clutch-controlled drive shaft for the infeed conveyor and the loading rams;

FIGURE 15 is a detail section taken along line 15—15 of FIGURE 14 to show further aspects of the clutch;

FIGURE 16 is a detail vertical section taken along line 16—16 of FIGURE 7 and showing the overload cut-out arrangement;

FIGURE 17 is a detail horizontal section taken along line 17—17 of FIGURE 7 and showing the eccentric drive for producing incremental motion of the loading rams;

FIGURE 18 is a vertical section of FIGURE 17;

FIGURE 19 is a diagram showing the time sequence relationships of certain functions carried out during a single packaging machine cycle; and FIGURE 20 is a diagrammatic showing of means for preventing the loading of articles into a defective package.

Referring now to FIGURE 1, there is shown a packaging machine 30 of the basic type disclosed in copending application Serial No. 842,365 filed by R. A. Mahaffy on September 25, 1959, now Patent No. 3,061,984. This machine includes an endless chain of trays 32 which move with an intermittent motion past a series of packaging stations, generally indicated at 34, along the upper horizontal reaches of the chain of trays. The trays move through these stations from right-to-left as viewed in FIGURE 1, and automatically-operable devices at the various stations perform packaging operations during the machine "dwell" time, i.e., while the trays are stopped.

One of the initial packaging operations consists of vacuum-forming a first layer of stretchable transparent plastic down into the side-by-side tray cavities 36a and 36b, this plastic being applied in sheet form from a supply roll 38. Thereafter, the products to be packaged are loaded into these tray cavities, as will be explained in detail hereinbelow. A second layer of plastic from a supply roll 40 then is placed over the top of the trays and is sealed to the marginal edges of the first plastic layer to form the packages. These packages subsequently are evacuated and completely sealed from atmosphere, so that thereafter the individual packages containing the products can be separated for delivery to the consumer.

The products to be packaged, in this case frankfurters, are delivered to the machine 30 by an infeed conveyor system generally indicated at 42. Moving longitudinally down the trough of the conveyor structure is a closely-woven, stainless-steel wire-mesh belt 44 (see also FIGURE 2) on which the frankfurters are placed, e.g., by operators stationed along the sides of the conveyor. The return path for belt 44 extends beneath the conveyor structure, passing over suitable support rollers as indicated at 46.

The belt 44 extends longitudinally in towards the machine 30 approximately to the line labelled A—A in FIGURE 1; from that point on, a double ladder chain system 48 (FIGURE 5) completes the remainder of the conveyor path to the loading station 50. A ladder chain system is used in this region simply because it is more compact and has a smaller turning radius than the wire-mesh belt. In function, however, it can be considered essentially as an extension of the belt.

Referring again to FIGURE 2, above the belt 44, and moving along the conveyor 42 in synchronism therewith, are a pair of side chains 52 and 54 and a center chain 56, the return paths for which extend along the top of the conveyor. The side chains are mounted in respective split guide rails 58 and 60, formed of plastic, and each side chain carries a series of evenly-spaced, inwardly facing "flights" in the form of block-shaped plastic members 62 and 64. The center chain 56 moves beneath a plastic guide strip 66, advantageously provided with a stainless-steel covering, which is supported by a V-shaped structure 68 secured to the upper portions of the conveyor 42. This center chain carries a series of light pairs 70 extending out from both sides of the chain, and which cooperate with the directly opposite flights 62 and 64 and the belt 44 to form, in effect, a double row of box-like enclosures for carrying collated groups of frankfurters, as best illustrated in FIGURE 5.

The overall height of the flights 62, 64 and 70 and the chain guides 58 and 60 is, in the preferred embodiment of the invention, approximately 1¾", which is sufficient to enclose two rows of frankfurters. The frankfurters are placed between the flights in a direction transverse of the longitudinal machine direction. The ends of the upper row of frankfurters engage the side guide rails 58 and 60 and the center guide strip 66, while the ends of the lower row of frankfurters engage the side guide rails and a central spacer strip 72 which rests on the belt 44 beneath chain 56 and is held at the remote end of the conveyor structure.

The side guide rails 58 and 60 are individually adjustable laterally to accommodate different product dimensions. Preferably, these strips extend at a slight angle with respect to the longitudinal direction, so as to provide continually decreasing lateral spacing as the frankfurters approach the loading station 50. Such an arrangement serves to compress any over-sized frankfurters axially and thus help to assure alignment of the frankfurter ends when they are loaded into the packaging trays 32.

Referring now to FIGURES 4, 5 and 6, the flights 62, 64 and 70 push the frankfurters from the end of the ladder chain system 48 onto two pairs of trap doors 74, 76 and 78, 80, one pair for each of the tray cavities 36a and 36b. The outer trap doors 74 and 80 are pivoted at their remote ends 82 and 84, and the inner trap doors are pivoted about a common center axis 86. All of the trap doors are spring-loaded upwardly against stops in the horizontal position shown in bold outline, and the spring pressure is sufficient to prevent the doors being opened by the weight of the frankfurters. The free ends of the trap doors are formed with upwardly-turned portions 74a–80a presenting longitudinally-extending knife edges (precision machined with a radius of about .005") on which the frankfurters can readily slide without rolling or tumbling.

Positioned above each pair of trap doors 74, 76 and 78, 80 are corresponding pairs of loading rams 88, 90, 92, 94. These rams comprise fork-like elements with oppositely-pointing, generally horizontal tines 88a–94a disposed in an interleaved relationship which define an essentially planar surface while permitting relative longitudinal movement between the corresponding rams for reasons that will be apparent as the description proceeds. When a group of frankfurters has been shifted onto the trap doors, these rams are driven in a downwardly direction against the frankfurters which transmit the ram pressure to the trap doors so as to open these doors to their vertical positions (as shown in broken outline in FIGURE 6). Continuation of the ram down stroke forces the frankfurters into the corresponding cavities 36a, 36b of a tray 32 positioned immediately beneath.

During this transfer, the spring-biased trap doors 74–80 serve as guides to further compress the frankfurters axially, and thus tend to assure alignment between the ends thereof. The sides of the frankfurters engage the sharp edges presented by a plurality of chromium-plated square posts 96. Four of these posts extend up above the level of the conveyor flights 62, 64 and 70 to serve as stops for the frankfurters at the forward end of the loading station 50, and are so positioned laterally as to avoid interference with the movement of the flights. The remainder of the posts extend up to just below the flights, and have outwardly curved upper portions to provide gradual engagement and compression of the frankfurters.

Since at certain times the loading apparatus must function when no frankfurters are on the trap doors, two of the rams 90 and 94 are equipped with cam surfaces 91 and 95 which are adapted to engage corresponding cam surfaces on the trap doors. This permits the trap doors to open and close, as the cycle progresses, without contact with the knife edges 74a–80a. Accordingly, wear of these knife edges is avoided.

The loading rams 88–94 are driven during a major portion of their downward movement with an acceleration of approximately 1 g. By thus providing a continual increase in ram velocity, it has been found possible to prevent any disarray of the collated arrangement of the frankfurters during their transfer to the tray 32. Under certain circumstances, e.g., with a relatively heavy spring-load pressure on the trap doors 74–80, it is possible to attain this result with accelerations less than 1 g, but for conditions providing a more nearly free fall for the frankfurters accelerations of about 1 g or higher must be used.

Shortly before the end of the downward stroke of the rams 88–94, the acceleration of their movement is sharply reduced, and the rams subsequently are stopped after penetrating about ⅛" into the tray cavities 36a, 36b. During this latter phase of the downward stroke, i.e., after the accelerating phase, the frankfurters continue down towards the packaging tray 32 on ballistic paths, and retain their original spacial relationship even though no longer in contact with the rams. Thus the frankfurters are consistently placed in a tightly-packed arrangement within the confines of the tray cavities.

As explained heretofore, the trays 32 are moved with an intermittent indexing motion (curve 98, FIGURE 19), and the loading ram movement described above (basically as represented by curve 100, FIGURE 19) takes place while the trays are stopped in their dwell period. To provide certain important simplifications in equipment design, the conveyor system 42 is driven continuously rather than intermittently. However, the speed of the conveyor is varied in such a manner that during the loading operation the conveyor moves at a relatively slow speed, and during the periods between loading operations the conveyor is driven at relatively faster speeds (see the flight velocity curve 102, FIGURE 19). With the conveyor moving continuously, it has been found advantageous to shift the rams 88–94 slightly forward during the initial portion of their down stroke, in order to match approximately the forward speed of the frankfurters. Also, to prevent interference with the conveyor flights on the upstroke, the rearwardly facing rams 88 and 92 are moved forward in a "folding" movement with respect to the other rams 90 and 94. These actions are developed in the manner now to be described.

The movements of rams 88–94 are controlled by modified four-bar linkages which produce not only the required vertical movement but also the special horizontal motion components in proper synchronism. In more detail, rams 88 and 92 are carried on the lower end of a first support member 104 which is pivotally pinned at 106 to the left-hand (forward) end of a control arm 108. At the start of a loading operation, this control arm is positioned so that it slopes down at an angle with respect to horizontal, as shown in FIGURE 5. At its right-hand end, arm 108 is secured to a main shaft 110 which is rotatably mounted with respect to the machine frame 112 and is oscillated in synchronism with the movement of the conveyor system 42. Also pinned to support member 104 is a link 114, generally parallel to arm 108, and pivoted at its other end to a crank eccentric 116 secured to a shaft 118 directly below shaft 110. Member 104, control arm 108 and link 114, together with the machine framework, constitute the four-bar linkage for rams 88 and 92.

The other two rams 90 and 92 are carried by a second support member 120 which, like member 104, is pivotally pinned at 106 on the forward end of control arm 108. Also pinned to member 120 is a link 122, generally parallel to arm 108, which is secured by an eccentric 124 to a shaft 126 directly below shafts 110 and 118. Member 120, control arm 108 and link 122, together with the machine framework, constitute the four-bar linkage for rams 90 and 94.

The main shaft 110 for control arm 108 extends through the rear frame 112 of the machine and on its other end is secured to a drive arm 128 (FIGURE 7) which is parallel to arm 108. Arms 108 and 128 also are joined intermediate their ends by a strengthening strut 130 which passes through a curved slot 132 in the machine frame. Drive arm 128 is pivotally connected at its left-hand end to a vertical link 134 extending down to a lever 136 having a pivot mounting 138 at its other end. This lever carries, at about its midpoint, a cam follower 140 which rides in a track 142 in a cam disc 144 (see also FIGURE 9) driven at constant speed in synchronism with the operation of the packaging machine 30. Once each revolution of this disc, the lever 136 is pulled down so as to rotate arms 128 and 108 counterclockwise and thereby force the rams 88–94 down to load the frankfurters into the tray 32 as described above. The timing sequence of the ram movement produced by cam disc 144 is shown by curve 100, FIGURE 19.

As noted hereinabove, the conveyor slows down but does not stop during the loading operation. In order to facilitate a smooth transfer of the moving frankfurters to the packaging tray 32, it has been found desirable to move the rams 88–94 forward at approximately the horizontal speed of the frankfurters until the latter have been pushed down about to the lower surface of the conveyor flights 62, 64 and 70. This forward movement is produced as a result of the fact that the control arm 108 initially extends upwardly from shaft 110 at an angle with respect to the longitudinal machine direction, and thus as the outboard end of this arm moves down, it also moves forward a slight amount, carrying with it the support members 104 and 120 and the rams 88–94.

After the control arm 108 reaches a horizontal position, at which time the ram forks 88a–94a will have moved approximately below the conveyor flights 62, 64 and 70, there will be no more forward movement of the rams due to the arc-path motion of the control arm. Moreover, the continued rotation of arm 108, during the remainder of the down stroke of the rams, tends to produce a reverse longitudinal component of motion of the rams. Since such reverse movement would be detrimental to the functioning of the loading apparatus herein disclosed, this embodiment includes means for assuring that the rams move essentially vertically during the remainder of the down stroke.

For this purpose, and referring again to FIGURE 7, there is shown a cam 146 secured to drive arm 128 and adapted, when arm 128 has been moved approximately to its horizontal position, to engage a follower 148 on the upper end of a lever 150; lever 150 is pivoted at 152, and its lower end is connected to a link 154 arranged to rotate a crank 156 on shaft 126. Accordingly, as the arm 128 moves down below its horizontal position, shaft 126 is rotated counterclockwise and, through eccentric 124 (FIGURE 5) shifts link 122 a short distance to the left. Curve 158 of FIGURE 19 shows the time relationship of the operation of cam 146 with respect to the packaging machine cycle and the vertical ram movement represented by curve 100.

As a result of the counterclockwise rotation of shaft 126, the motion of ram support member 120 is modified in such a manner that there is essentially no longitudinal movement of the rams 90 and 94, carried by this support member, during the portion of the vertical movement of these rams between the flights 62, 64 and 70 and the bottom of the down stroke. It may be noted, that, although the cam 146 directly controls only the support member 120 carrying rams 90 and 94, the other support member 104 is spring-biased against member 120 (by means to be described) during the down stroke, the spacing between these members (about 1/16") being fixed by an adjustable set screw 160 in the forward support member 104. As a result of this spring bias arrangement, the motion of rams 88 and 92 follows exactly the motion of rams 90 and 94 during the down stroke.

During the initial portion of the up stroke, rams 88 and 92 are independently moved longitudinally forward still further, the ram forks 88a and 92a being telescoped into the other pair of ram forks 90a and 94a so as to occupy less combined space in the longitudinal direction. This "folding" movement of the rams 88 and 92 assures that there will be no interference between these rams and the continuously moving conveyor flights 62, 64 and 70 during retraction of the rams, and is accomplished in the manner now to be described.

Referring to FIGURES 5 and 7, the forward longitudinal movement of rams 88 and 92 on the up stroke is produced by rotation of shaft 118 which is connected through a crank 162 and levers 164, 166 and 168, to a cam follower 170 adapted to engage a cam 172. Crank 162 is biased by a spring 174 tending to rotate shaft 118 counterclockwise, this spring bias serving to urge the ram support member 104 back against the other support member 120 during the down stroke, as mentioned hereinabove, and also serving to hold the follower 170 away from cam 172 during that phase of the operation. However, as the rams start upwards, the cam 172 engages follower 170 (approximately at 235° of the machine cycle, referring to curve 176 of FIGURE 19) and begins to rotate shaft 118 clockwise. Cam 172 is arranged to move rams 88 and 92 forward at a speed which effectively matches the forward movement of the conveyor flights 62, 64 and 70. After the rams have moved up above these flights, the cam follower 170 drops off the high point of cam 172, thus permitting rams 88 and 92 to move back to the right. Thus, all of the rams 88–94 return to their original expanded relationship (as shown in FIGURE 5) in preparation for the next loading operation.

FIGURES 10–13 illustrate the movement of the rams 88–94 during a complete loading operation, although only two of the rams 88 and 90 are shown. In FIGURE 10, the rams have moved down and slightly forward from their original position as shown in FIGURE 5, the lower surfaces of the rams being about even with the upper surfaces of the conveyor flights 70. FIGURE 11 shows the rams down at about the lower surfaces of the flights, the rams having also moved forward slightly to match the forward movement of the frankfurters while the latter still are being pushed by the flights. In FIGURE 12, the rams have moved essentially straight down from their FIGURE 11 position, but the flights have moved further forward so that the rear flight now is actually above ram 88. In FIGURE 13, the rams have been retracted upwards to a point about level with the lower surface of the flights, and ram 88 has been moved forward to avoid interference with the rear flight. As the rams complete the up stroke, ram 88 continues this forward movement, always staying just ahead of the rear flight, until the rams have completely cleared the flights. Thereafter, both rams return to their normal position as shown in FIGURE 5.

Referring now to FIGURE 14, cam disc 144 and cam 172 both are rotated by a common shaft 178, the power for which is transmitted through a clutch generally indicated at 180. This clutch includes a rocking plate 182 (see also FIGURE 15) which is mounted in pivot bearings 184 and 186 on a sprocket 188. This sprocket is integral with a sleeve 190 which is rotatably mounted on a bushing 192 fixed to shaft 178. Sprocket 188 is driven by a chain 194 (FIGURE 9) from another sprocket 196 on a drive shaft 198 of the packaging machine 30, these two sprockets being arranged to provide a one-to-one speed relation between shaft 198 and shaft 178. (Note: drive shaft 198 corresponds to shaft 37 in the above-identified copending application Serial No. 842,365.)

Clutch plate 182 carries an adjustable dog 200 which extends through a hole 202 in sprocket 188 to engage a radial slot 204 in a face cam 206 integral with the cam disc 144. A bias spring 208 bears against plate 182 to urge the dog 200 into its slot, and thereby engage the clutch so as to connect sprocket 188 to shaft 178. Since there is only one rotational position of this sprocket relative to shaft 178 at which the dog can drop into its slot, this arrangement establishes the desired synchronism of the loading apparatus with the operation of the packaging machine 30.

Shaft 178 also carries an eccentric sprocket 210 engaged with a chain 212 extending up to another sprocket 214. The latter sprocket is mounted on a shaft 216 which (referring now to FIGURES 4 and 5) extends through the machine frame 112 and carries sprockets 218 for the conveyor flight chains 52–56. The eccentric mounting of sprocket 210 on shaft 178 produces the non-uniform velocity of these flight chains as depicted in curve 102 of FIGURE 19, the periodic change in the effective radius of sprocket 210 being accommodated by the movement of an idler sprocket 220 mounted on a pivoted lever 222 biased by a spring 224.

Shaft 216 also carries a sprocket 226 the chain 228 of which passes around idlers 230 and 232 and drives a pair of sprockets 234 and 236. These latter sprockets are mounted on corresponding shafts 238 and 240 which transmit the drive power to the conveyor belt 44 and the ladder chain 48 respectively, so that the motion of these conveyor elements matches exactly the non-uniform motion of the conveyor flights 62, 64 and 70.

The clutch plate 182 also carries a roller 242 adapted to be engaged by the flat side surface of a clutch-release lever 244 which is shiftable to the left (referring to FIGURE 14) so as to rock the clutch plate about its pivot axis and retract dog 200 from its slot 204. Referring also to FIGURES 4, 7 and 8, release lever 244 is secured at one end to a clutch control shaft 246 which is mounted for axial movement in bearings 248 and 250; the other end of release lever 244 is bifurcated to extend around a fixed pin 252 to prevent rotation of the lever and keep it from rubbing against shaft 178. The clutch control shaft 246 is shiftable axially, against a bias spring 254, by a cam 256 which is rotatable by a hand lever 258. Thus the clutch may be released at any time manually from the front of the machine.

Clutch control shaft 246 also may be shifted axially, so as to release clutch 180, by a spring-biased air cylinder 260 (FIGURE 8) which is mounted on the machine frame with its plunger 262 in engagement with a shoulder member 264 secured to shaft 246. This air cylinder forms part of an arrangement for preventing the loading of products into defective packages, as will now be described.

Referring to FIGURE 20, the apparatus includes a conventional vacuum-sensing switch 266, which is connected to the conduit (not shown herein) supplying vacuum for forming the plastic sheet 38 down into the tray 32 at the loading station 50. For example, the switch 266 may be connected to this vacuum supply conduit at the point identified with the reference numeral 58 in copending application Serial No. 192,188, filed by the present applicants on May 23, 1962, now Patent No. 3,125,-839. A proper vacuum draw in this conduit will open the switch contacts 268.

Normally-closed contacts 268 of vacuum switch 266 are connected in series with another set of switch contacts 270 operated by a cam 272 rotated by the main machine drive shaft 198. Cam 272 is arranged to close contacts 270 after the start of the machine "dwell" period and before the start of the downward movement of the rams 88–94, and then to reopen these contacts shortly before the end of the packaging machine cycle. If the vacuum-forming operation at the loading station is normal, contacts 268 will be opened by vacuum switch 266 prior to the time that contacts 270 are closed by cam 272, and after the loading operation has been completed, cam contacts 270 will be opened before vacuum switch contacts 268 again close. In other words, with a normal vacuum-forming operation, the cam switch contacts 270 will be closed only during the time that the vacuum switch contacts 268 are open. Thus, the electrical circuit through switch contacts 268 and 270 will not be completed if the packaging machine is functioning properly.

However, if for any reason the pressure in the vacuum-forming supply conduit does not drop to the required low level subsequent to the start of the machine dwell period, e.g., if there are leaks in the plastic sheet material 38 then being drawn down into the tray 32 in the loading station 50, the vacuum switch contacts 268 will not be opened before the cam switch contacts 270 are closed. In that event, an electrical circuit will be completed from the A.-C. power line through contacts 268 and 270 to energize a solenoid-operated valve 274. When this valve is energized, it transmits air pressure to the spring-biased air cylinder 260, causing this cylinder to shift the clutch-release lever 244 down (referring to FIGURE 8) and thereby disengage the clutch 180.

Once the clutch 180 has been disengaged in this manner, it cannot be re-engaged until after the end of the machine cycle, since the clutch dog 200 must rotate one complete revolution before it can again drop into the slot 204. Therefore, the sensing of a defective package at the loading station 50 by means of the vacuum switch 266 causes the loading apparatus to skip one complete loading cycle. Preferably, an adjustable orifice is provided on the solenoid valve 274 to delay the re-engagement of the clutch for an additional cycle, so that the loader apparatus will skip two complete cycles in the event of a single defective package.

The loading apparatus described herein also is provided with automatic cut-out means for preventing damage to the machinery in the event that the rams 88–94 encounter unusual resistance during a loading operation. Referring now to FIGURES 7 and 16, the vertical connecting link 134 comprises a pair of side straps 276 and 278 to which are secured three blocks 280, 282 and 284. The upper block 280 carries a bolt 286 forming part of the "heim" joint 288 which pivotally connects the link 134 to the drive arm 128. The lower block 284 carries a bushing 290 through which extends a rod 292 pivotally connected at its lower end to the lever 136. This rod 292 extends up between the side straps 276 and 278, through a bushing 294 in the center block 282, and bears against the lower end of the bolt 286.

A collar 296 is secured to the rod 292 by means of a shear pin 298, and a preloaded stiff drive spring 300 is positioned between this collar and the lower block 284. When the rod 292 is pulled down by the lever 136, this spring serves to transmit the motion to the lower block 284, and thence through the straps 276 and 278, the upper block 280, and the bolt 286 to the pivot joint 288, so as to operate the rams 88–94 as described hereinabove. The resistance of the spring 300 is sufficiently great that there is no deflection of this spring during normal operation of the loading apparatus.

In the event that any of the loading rams 88–94 encounters any unusual resistance during their downward movement, the drive spring 300 will be compressed and the rod 292 thus will move downwards relative to the side straps 276 and 278. Spot-welded to these straps in a region just below the upper block 280 is a U-shaped bracket 302 on which is pivotally mounted at 304 an L-shaped lever 306. The vertical arm 308 of this lever is urged outwardly by a spring 310 seated in the center block 282. The horizontal arm 312 of lever 306 is apertured to permit the rod 292 to pass therethrough, and the lower surface of this horizontal arm bears against a washer 314 resting on a retaining ring 316 fitted to the rod 292. Thus, as the rod moves down relative to the side straps 276 and 278, lever 306 is rotated about its pivot point 304 under the urging of the bias spring 310.

Accordingly, when the rams 88–94 encounter any unusual resistance during a loading operation, the vertical arm 308 of lever 306 moves outwardly to operate a limit switch 318. This switch is arranged, by conventional means not shown herein, to de-energize the motor drive system for the entire packaging and loading apparatus, thereby eliminating the possibility of damage to the equipment which would otherwise result from continuing the power drive to the various components.

It should be noted that the use of L-shaped lever 306 with its vertical switch-operating arm 308 moving with link 134 permits the limit switch 318 to be actuated at any part of the loading operation, and yet there is no interference with the transmission of motion to the rams 88–94 during normal operation. It also may be noted in passing that the vertical arm bias spring 310 develops very little force relative to that of the drive spring 300, and thus does not produce any significant deflection of the latter spring.

In the event that any of the loading rams 88–94 encounters exceptionally severe resistance during their down stroke, the drive spring 300 will be compressed to its solid height and the shear pin 298 connecting the collar 296 to the rod 292 will be broken, thereby completely disengaging the drive arm 128 from the rod 292. When this occurs, the rams will immediately be lifted to their upper limit by a heavy support spring 320 (FIGURE 5) the lower end of which is fastened to the control arm 108. Accordingly, the rams will be held up away from the remainder of the packaging and loading apparatus, so that no damage can occur due to interference between the moving parts.

As described hereinabove, it is possible to disengage the clutch 180 at any time by means of the hand lever 258, and thereby stop operation of the loading apparatus while the packaging machine 30 continues to function. Since the clutch could be disengaged while the rams 88–94 are at the bottom of their stroke extending into the cavities 36a and 36b of the tray 32, the apparatus herein also includes means for preventing the tray from striking the rams during the next indexing movement.

Referring now to FIGURE 7, the pivot mounting 138 for the lever 136 is secured eccentrically to a shaft 322 which, referring also to FIGURES 17 and 18, is oscillated by a crank 324 in synchronism with the operation of the packaging machine 30. This crank is controlled by a linkage mechanism comprising a link 326 and levers 328, 330 pivoted about a common axis 332. A spring 334 biases crank 324 counterclockwise, thus urging a cam follower 336 on lever 330 against a cam 338. This cam is keyed to a shaft 340 which is rotated by the drive system of the packaging machine 30 at one revolution per machine cycle. (Note: shaft 340 corresponds to the shaft identified with reference numeral 39 in the above-mentioned copending application Serial No. 842,365.)

As the packaging machine goes through its cycle of operations, cam 338 transmits an oscillatory motion through follower 336 and its associated linkage mechanism to shaft 322 which, through the eccentrically-mounted pivot 138, oscillates the left-hand end of lever 136 with a motion that is predominantly vertical, and thereby transmits an incremental up-and-down motion to the rams 88–94 once each machine cycle. The timing sequence of this incremental motion is illustrated by curve 342 of FIGURE 19 which shows that the downward incremental movement of the rams starts shortly after the beginning of the packaging machine "dwell" period and reaches its lower limit before the start of the actual loading movement of the rams (curve 100 of FIGURE 19) towards the tray 32. Subsequent to the completion of the ram loading movement, i.e., after the rams have been retracted by continued rotation of the cam disc 144, the incremental upward movement of the rams takes place and is completed before the end of that machine cycle. This incremental movement of the rams occurs whether the clutch 180 is engaged or not, and moves the rams a vertical distance sufficient to assure that they are entirely clear of the tray at the end of the machine cycle. Consequently the clutch may be disengaged at any position of the loading rams without possibility of damage to the packaging machine or the loading apparatus.

Although a preferred embodiment of the invention has been set forth in detail, it is desired to emphasize that this is not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

We claim:
1. Packaging apparatus comprising movable means having a series of package-forming receptacles, a continuously-driven conveyor including means for pushing the products to be packaged onto a loading station adjacent said movable means, ram means mounted for movement along a path to engage the products at said loading station and to force the products into corresponding receptacles, said ram means including first and second elements arranged for movement relative to one another parallel to the direction of movement of said conveyor, drive means for moving said ram means in a generally straight line direction transverse to the product movement, and control means producing said relative movement of said first and second ram elements while said ram means is being retracted from said receptacles, thereby to avoid interference with said conveyor pushing means.

2. Packaging apparatus comprising movable means having a series of package-forming receptacles, a continuously-driven conveyor including means for pushing the products to be packaged onto a loading station adjacent said movable means, trap door means at said loading station, ram means mounted for movement along a path to engage the products at said loading station and to force the products through said trap door means and into corresponding receptacles, said ram means including first and second fork-like elements having oppositely-directed intermeshed tines arranged for movement relative to one another parallel to the direction of movement of said conveyor, said first and second elements defining a generally planar surface adapted to engage the products to be packaged, drive means for moving said ram means in a generally straight line direction transverse to the product movement, and control means producing said intermeshing movement of said first and second ram elements while said ram means is being retracted from said receptacles, thereby to avoid interference with said conveyor pushing means.

3. Packaging apparatus comprising movable means having a series of package-forming receptacles, a continuously-driven conveyor including chain-suspended flight means defining box-shaped enclosures for the products to be packaged and arranged to push the products onto a loading station above said movable means, ram means mounted for movement along a generally vertical path to engage the products at said loading station and to force the products down into corresponding receptacles, said ram means including first and second fork-shaped elements arranged for intermeshing movement relative to one another parallel to the direction of movement of said conveyor, drive means for moving said ram means in a generally straight line direction transverse to the product movement, and control means producing said intermeshing movement of said first and second ram elements while said ram means is being retracted from said receptacles, thereby to avoid interference with said conveyor flight means.

4. Packaging apparatus comprising cyclically-operable movable means having a series of package-forming receptacles, a conveyor for carrying the products to be packaged to a loading station adjacent said movable means, ram means mounted for movement along a path to engage the products at said loading station and to force the products therefrom into corresponding receptacles, main machine drive means, power transmission means including clutch means for coupling said drive means to said ram means for moving said ram means along said path, said ram means being arranged to extend at least a small distance into the corresponding receptacle during the product loading operation, and incremental motion-producing means being coupled to said main machine drive means independently of said clutch means and arranged to shift said ram means towards and away from said movable means responsive to the operation of said packaging apparatus, said motion-producing means being timed with respect to said main machine drive means to assure that said ram means is retracted from the corresponding receptacle when the movable means is moved from beneath the loading station, thereby to prevent mechanical interference in the event said clutch means is disengaged while said ram means is within the corresponding receptacle.

5. Apparatus as claimed in claim 4, wherein said power transmission means includes a lever which is eccentrically pivoted at one end to a shaft rotated by said main machine drive means, cam means controlled by said clutch means to oscillate said lever about said one end, and a linkage connecting the other end of said lever to said ram means.

6. Packaging apparatus comprising movable means having a plurality of package-forming receptacles, a loading station adjacent the path of movement of said receptacles, ram means operable to force products from said loading station and into the corresponding receptacle, link means coupled at one end to said ram means, motor-operated drive means, a drive member adjacent said link means and oscillated by said drive means, a drive spring interconnecting said member and said link means, said drive spring being sufficiently stiff that it is not compressed significantly in transmitting the normal ram operating force from said drive means, position-sensing means responsive to the relative displacement between said link means and said drive member which would be produced in the event said ram means encounters abnormal resistance so as to cause significant deflection of said drive spring, and control means operable by said position-sensing means to stop the loading operation when said ram means encounters such abnormal resistance.

7. Apparatus as claimed in claim 6, including shear pin means for transmitting the ram operating force from said drive member and through said drive spring to said link means, and bias spring means urging said ram means away from said receptacles, whereby if said shear pin means is broken the ram means is held away from said movable means.

8. Packaging apparatus comprising movable means having a plurality of package-forming receptacles, a loading station adjacent the path of movement of said receptacles, ram means operable to force products from said loading station and into the corresponding receptacle, link means comprising an elongated element coupled at one end to said ram means, motor-operated drive means, an elongated drive member extending alongside said link means element and oscillated by said drive means, a drive spring interconnecting said member and said link means, said drive spring being provided with substantial resistance so that it is not compressed significantly in transmitting the normal ram operating force from said drive means, position-sensing means comprising a rotatable lever mounted for movement with said link means and said drive member and responsive to the relative displacement therebetween which is produced when said ram means encounters abnormal resistance so as to cause significant deflection of said drive spring, said position-sensing means including an arm which moves transverse to the direction of motion of said link means, and switch means operable by the movement of said arm to stop the loading operation when said ram means encounters abnormal resistance.

9. Apparatus as claimed in claim 8, wherein said link means includes a pair of side pieces, said drive member comprising a rod extending between said side pieces, said drive spring consisting of a coil spring surrounding said rod.

10. Packaging apparatus comprising a plurality of elements arranged to receive plastic packaging material to be formed into packages, said receiving elements being disposed serially in the form of an endless loop and mounted for simultaneous movement together around a closed path; first drive means for moving said receiving elements about said path to permit packaging operations to be carried out at selected positions along said path; means automatically operable at one of said positions to secure to said receiving elements a thin sheet of stretchable plastic packaging film; means for stretching said film while secured to said receiving elements to form respective cup-shaped product receiving package sections moving with said elements; conveyor means for delivering groups of products to said stretch-formed package sections for deposit and packaging therein, said conveyor means having at least a portion thereof above said formed package sections to accommodate loading said groups of products downwardly into the package sections; a loading station adjacent said conveyor means to receive at least one group of said products at a time in preparation for the transfer thereof into a corresponding one of said package sections at a second position subsequent to said one position; ram means mounted above said loading station for reciprocating movement down against the products at said loading station; second drive means for accelerating said ram means smoothly towards the products at said loading station and for forcing the products from said loading station into the formed package section immediately below; said second drive means operating to move said ram means at an accelerated velocity assuring maintenance of the orientation of the products as they are forced into the waiting plastic film package section; and means at a third position subsequent to said second position for completing each package by securing packaging material to each formed package section so as to surround the group of products loaded therein and produce compact packages.

11. Apparatus as claimed in claim 10, wherein said ram means comprises a vertical member having at its lower end a product-contacting element, a control arm having one end pivoted to the upper end of said vertical member, a main drive shaft secured to the other end of said control arm to provide reciprocating rotary motion thereto, said control arm in the retracted position of said ram means being approximately horizontal and operable when driven by said main shaft to reciprocate said ram means member vertically as required for loading of said products.

12. Apparatus as claimed in claim 11, including a link pivotally pinned to said vertical member intermediate the ends thereof, said link extending approximately parallel to said control arm; and means secured to the other end of said link to effect an axial movement of said link to control the longitudinal movement of said ram means during a loading operation.

13. Apparatus as claimed in claim 10, including linkage means for reciprocating said ram means, a rotating drive cam, a cam follower for said cam and coupled to said linkage means to furnish the required motion thereto, said cam serving to positively engage and displace said cam follower during the down stroke of said ram means.

14. Apparatus as claimed in claim 13, wherein said drive cam comprises a track formed in a rotating member, said cam follower being engaged with said track to provide positive operation of said ram means on both the down and upstroke of said ram means.

15. Apparatus as claimed in claim 13, wherein said cam means provides a smooth acceleration of said ram means to a region approximately intermediate the ends of the stroke, and thereafter provides a smooth deceleration of said ram means down to the bottom of the stroke.

16. Packaging apparatus comprising a plurality of elements arranged to receive plastic packaging material to be formed into packages, said receiving elements being disposed serially in the form of an endless loop and mounted for simultaneous movement together around a closed path; first drive means for moving said receiving elements about said path to permit packaging operations to be carried out at selected positions along said path; means automatically operable to secure to said receiving elements a thin sheet of stretchable plastic packaging film; means for stretching said film while secured to said receiving elements to form respective cup-shaped product-receiving package sections moving with said elements; conveyor means for delivering groups of products to said stretch-formed package sections for deposit and packaging therein, said conveyor means having at least a portion thereof above said formed package sections in one position thereof to accommodate loading said groups of products downwardly into the package sections; a loading station immediately above said one position and adjacent said conveyor means to receive at least one group of said products at a time in preparation for the transfer thereof into a corresponding one of said package sections; said loading station comprising pivoted trap door means spring-loaded into a product-supporting position with sufficient strength to hold the products against the force of gravity prior to a loading operation; ram means mounted above said loading station for reciprocating movement down against the products resting on said trap door means at said loading station; second drive means for accelerating said ram means towards the products on said trap door means and for forcing the products through and into the formed package section immediately below by pressing open said trap door means against the spring-loading thereof; said second drive means moving said ram means at an accelerated velocity assuring maintenance of the orientation of the products as they pass through said trap door means into the waiting plastic film package section; and means at a position subsequent to said one position for completing each package by securing packaging material to each formed package section so as to surround the group of products loaded therein and produce compact packages.

17. Packaging apparatus comprising a plurality of elements arranged to receive plastic packaging material to be formed into packages, said receiving elements being disposed serially in the form of an endless loop and mounted for simultaneous movement together around a closed path; first drive means for moving said receiving elements about said path to permit packaging operations to be carried out at selected positions along said path; means automatically operable at one of said positions to secure to said receiving elements a thin sheet of stretchable plastic packaging film; means for stretching said film while secured to said receiving elements to form respective cup-shaped product-receiving package sections moving with said elements; conveyor means for delivering groups of products to said stretch-formed package sections for deposit and packaging therein, said conveyor means having at least a portion thereof above said formed package sections to accommodate loading said groups of products downwardly into the package sections; said conveyor means including means to hold each group of products packed together in contact with one another in a collated configuration of the form in which the products are to be packaged; a loading station adjacent said conveyor means to receive at least one group of said products at a time in preparation for the transfer thereof into a corresponding one of said package sections at a second position subsequent to said one position; said loading station including stationary means to hold each group of products in said collated configuration prior to a loading operation; ram means mounted above said loading station for reciprocating movement down against the group of products at said loading station; second drive means for accelerating said ram means towards the products at said loading station and for forcing the products from said loading station into the formed package section immediately below; said second drive means operating to move said ram means with an acceleration assuring maintenance of the orientation of the products as they are forced into the waiting plastic film package section; and means at a third position subsequent to said second position for completing each package by securing packaging material to each formed package section so as to surround the group of products loaded therein and produce compact packages.

18. Packaging apparatus comprising a plurality of receptacles having cup-shaped cavities arranged to receive plastic packaging material to be formed into packages, said receptacles being disposed serially in the form of an endless loop and mounted for simultaneous movement together around a closed path; first drive means for moving said receptacles about said path to permit packaging operations to be carried out at selected positions along said path; means to secure in the cavities of said receptacles corresponding cup-shaped product-receiving package sections formed of plastic and closely conforming to the outlines of the respective cavity; conveyor means for delivering groups of products to said package sections for deposit and packaging therein, said conveyor means comprising endless belt means moving in a closed path and having at least a portion thereof above said package sections to accommodate loading said groups of products downwardly into the package sections; said conveyor means further including a series of flights suspended out over said endless belt means and driven in synchronism therewith to define a series of box-like enclosures into which groups of products are placed with the individual products of each group touching one another in a tightly packed collated configuration of the form in which the products are to be packaged; a loading station adjacent said conveyor means to receive at least one group of said products at a time in preparation for the transfer thereof into a corresponding one of said package sections; ram means mounted above said loading station for reciprocating movement down against the products at said loading station; second drive means for accelerating said ram means towards the products at said loading station for forcing the products from said loading station into the formed package section immediately below; and means at a position subsequent to said loading station for completing each package by securing packaging material to each package section so as to surround the group of products loaded therein and produce compact packages sealed from outside atmosphere.

19. Apparatus as claimed in claim 18, wherein said flights are driven in a closed path above said endless belt means, said flight path extending out over said loading station so that the flights push the products from the conveyor belt means onto the loading station, the lower end of said ram means normally being above the line of movement of said flights over the loading station and being moved down between successive flights during a loading operation.

20. Apparatus as claimed in claim 19, wherein said flights are driven with a continuous motion during the operation of the packaging apparatus, and means operable during a loading operation to move said ram means with a component of motion parallel to the movement of said flights as they pass over said loading station, thereby to prevent interference between said ram means and said flights.

21. Packaging apparatus comprising, in combination, a plurality of interconnected trays arranged serially in the form of a loop and mounted for simultaneous movement around a closed path disposed in a vertical plane, said trays serving as receptacles having two side-by-side cavities facing away from the interior of said closed path; first drive means for moving said trays about said path to permit packaging operations to be carried out at selected positions along said path; means automatically operable at one of said positions to secure to said trays a thin sheet of stretchable plastic packaging film; means for drawing said film down into the cavities of said trays to form corresponding product-receiving package sections; conveyor means for delivering groups of products to said trays for deposit and packaging therein, said conveyor means comprising endless support means moving in a closed path and having at least a portion thereof above the upper reaches of said loop of trays to accommodate loading said groups of products downwardly into said cavities; said conveyor means including means to hold each group of products tightly packed together in touching contact in a collated configuration of the form in which the products are to be loaded into said receptacles; a loading station immediately above said upper reaches and adjacent said support means portion to receive said groups of products, said loading station including means to hold two side-by-side product groups in collated configuration in preparation for the transfer thereof into said trays at a second position subsequent to said one position; said loading station comprising two sets of side-by-side pivoted trap door means spring-loaded into a horizontal position with sufficient strength to hold the respective groups of products against the force of gravity prior to the loading operation; ram means mounted above said loading station for reciprocating movement down against both groups of products resting on said two side-by-side trap door means; second drive means for moving said ram means towards the products on said trap door means and for forcing the two groups of products through and into a waiting tray by pressing open said trap door means against the spring-loading thereof; and means at a third position subsequent to said second position to complete each package by forming plastic film entirely around each group of loaded products so as to produce a compact package sealed from outside atmosphere.

22. Apparatus as claimed in claim 21, wherein said support means comprises endless belt means for holding the side-by-side groups of products; and two sets of side-by-side flights extending along said endless belt means to define two series of box-like enclosures into which the groups of products are placed, each of the side-by-side groups of products being forced by the respective set of flights onto a corresponding one of the trap door means.

23. Packaging apparatus comprising a plurality of elements arranged to receive plastic packaging material to be formed into packages, said receiving elements being disposed serially in the form of an endless loop and mounted for simultaneous movement together around a closed path disposed in a vertical plane; first drive means for moving said receiving elements about said path to permit packaging operations to be carried out at selected positions along said path; means automatically operable at one of said positions to secure to each passing receiving element a thin sheet of stretchable plastic packaging film; means for stretching said film while secured to said receiving elements to form corresponding cup-shaped product-receiving package sections moving with said elements, the open mouths of said package sections facing away from the interior of said closed path; means at a second position subsequent to said one position to complete each package by securing packaging material to each of said package sections; conveyor means for delivering groups of products to said receptacles at a position along the upper reaches of said closed path and preceding said second position; said conveyor means comprising endless belt means moving in a closed path and having a horizontal working portion and a return portion both above said upper reaches of said closed path and in said vertical plane; belt support means mounted at a point just preceding said second position and defining the end of said working portion, said endless belt means extending around said support means to become said return portion moving oppositely to said working portion; a loading station immediately adjacent said end of said working portion to receive therefrom the groups of said products in preparation for the transfer thereof into said formed package sections; ram means mounted above said loading station for reciprocating movement down against the products transferred from said endless belt means to said loading station; and second drive means for accelerating said ram means towards the products at said loading station and for forcing the products from said loading station into the package section therebeneath.

24. Packaging apparatus comprising, in combination, a plurality of package-forming receptacles having cup-shaped cavities and arranged serially in the form of a loop, said receptacles being mounted for simultaneous movement around a closed path disposed in a vertical plane with the cavities of said receptacles facing away from the interior of said closed path; first drive means for moving said receptacles about said path to permit packaging operations to be carried out at selected positions along said path; means at one of said positions to secure in the cavities of said receptacles corresponding cup-shaped product-receiving package sections closely conforming to the outlines of the respective cavity; means at a second position subsequent to said one position to complete each package by forming packaging material across each open cavity so as to produce compact packages sealed from outside atmosphere; conveyor means for delivering groups of products to said receptacles at a position along the upper reaches of said closed path and preceding said second position; said conveyor means comprising endless belt means moving in a closed path and having a horizontal working portion and a return portion beneath said working portion, both of said portions being above said upper reaches of said receptacles and in said vertical plane; belt support means at a point just preceding said second position and defining the end of said working portion, said belt means extending around said support means to become said return portion moving in a direction opposite to said working portion; a loading station immediately adjacent said belt support means and aligned with said horizontal working portion to receive therefrom groups of said products in preparation for the transfer thereof into said receptacles; a series of flights suspended out over said endless belt means working portion and moving in synchronism therewith to define a series of product-containing enclosures; said flights being arranged in an endless loop the working portion of which extends out over said loading station to push the products onto said station from said endless belt, the return portion of said flight path being above the working portion of said flight path; ram means mounted above said loading station for reciprocating movement down against the products transferred to said loading station; and second drive means for accelerating said ram means towards the products at said loading station and for forcing the products from said loading station into the package section of a receptacle therebeneath.

25. Packaging apparatus comprising a plurality of package-forming receptacles arranged serially in the form of a loop and mounted for simultaneous movement together around a closed path; first drive means for moving said receptacles about said path to permit packaging operations to be carried out at selected positions along said path; means automatically operable to secure to said receptacles a thin sheet of stretchable plastic packaging film; means for drawing said film into the cavities of said receptacles to form corresponding product-receiving package sections conforming to the outlines of the respective cavity; conveyor means for delivering groups of products to said receptacles for deposit and packaging therein, said conveyor means comprising endless support means moving in a closed path and having at least a portion thereof above said receptacles in one position thereof to accommodate loading said groups of products downwardly into the cavities of the receptacles; a loading station immediately above said receptacles at said one position and adjacent said support means portion to receive at least one group of said products at a time in preparation for the transfer thereof into said receptacles at said one position; said loading station comprising pivoted trap door means spring-loaded into a horizontal position with sufficient strength to hold the products against the force of gravity prior to the loading operation; said trap door means being provided adjacent the outboard ends thereof with upstanding knife edges extending parallel to the longitudinal direction of said endless support means; ram means mounted above said loading station for reciprocating movement down against the products resting on said trap door means; second drive means for accelerating said ram means towards the products on said trap door means and for forcing the products through and into a waiting receptacle by pressing open said trap door means against the spring-loading thereof; said second drive means moving said ram means at an accelerated velocity assuring maintenance of the orientation of the products as they pass through said trap door means and into the plastic film package section in the receptacle therebeneath; and means at a position subsequent to said one position to complete each package by forming packaging material entirely around each group of loaded products.

26. Packaging apparatus comprising a plurality of package-forming receptacles arranged serially in the form of a loop and mounted for simultaneous movement around a closed path; first drive means moving said receptacles with an intermittent motion about said path to permit packaging operations to be carried out at selected positions therealong; means automatically operable at one of said positions to secure to said receptacles a thin sheet of stretchable plastic packaging film; means for stretching said film at said receptacles to form corresponding product-receiving package sections; conveyor means for delivering groups of products to said receptacles for deposit and packaging therein, said conveyor means comprising endless support means moving in a closed path and having at least a portion thereof above said receptacles to accommodate loading said groups of products downwardly into said package sections; second drive means for moving said conveyor means with a continuous motion; a loading station above said package sections and adjacent said support means portion to receive at least one of said groups of products at a time; ram means mounted above said loading station for reciprocating movement down against each group of products; third drive means for accelerating said ram means smoothly towards the products at said loading station and for forcing the products therefrom into the waiting package section; said third drive means accelerating said ram means to assure maintenance of the orientation of the products as they pass into the plastic film package section; and means to complete each package by forming packaging material entirely around each group of loaded products.

27. Apparatus as claimed in claim 26, wherein said second drive means moves said conveyor means at a reduced speed during a loading operation and at a faster speed during the times intervening each loading operation.

28. Packaging apparatus comprising a plurality of elements arranged to receive plastic packaging material to be formed into packages, said receiving elements being disposed serially in the form of an endless loop and mounted for simultaneous movement together around a closed path; first drive means for moving said receiving elements about said path to permit packaging operations to be carried out at selected positions along said path; means automatically operable at one of said positions to secure to said receiving elements a thin sheet of stretchable plastic packaging film; vacuum means for stretching said film while secured to said receiving elements to form respective cup-shaped product-receiving package sections moving with said elements; conveyor means for delivering groups of products to said stretch-formed package sections for deposit and packaging therein; loading means mounted adjacent said conveyor means and operable to transfer the products from said conveyor means into the formed package sections; second drive means for cyclically operating said loading means in synchronism with the movement of said receiving elements; sensing means responsive to the level of vacuum of the package sections at a position thereof prior to the loading of any products therein; and operating means controlled by said sensing means to prevent the transfer of any products by said loading means if the vacuum level detected by said sensing means indicates that the package section to be loaded is defective.

29. Apparatus as claimed in claim 28, including first switch means under the control of said sensing means, second switch means operated cyclically in synchronism with the movement of said receiving elements, and electrical circuit means including said first and second switch means to disable said loading means in the event that said first switch means is not operated by said sensing means at the time said second switch means is operated.

30. Packaging apparatus comprising a plurality of elements arranged to receive plastic packaging material to be formed into packages, said receiving elements being disposed serially in the form of an endless loop and mounted for simultaneous movement together around a closed path; first drive means for moving said receiving elements about said path to permit packaging operations to be carried out at selected positions along said path; means automatically operable at one of said positions to secure to said receiving elements a thin sheet of stretchable plastic packaging film; vacuum means for stretching said film while secured to said receiving elements to form respective cup-shaped product-receiving package sections moving with said elements; conveyor means for delivering groups of products to said stretch-formed package sections for deposit and packaging therein; ram means mounted adjacent said conveyor means and operable to load the products delivered by said conveyor means into the formed package sections; second drive means for cyclically operating said ram means in synchronism with the movement of said receiving elements; said second drive means including power transmission means for directing the motive power to said ram means; sensing means responsive to the level of vacuum of the package sections at a position thereof prior to the loading of any products therein; and operating means controlled by said sensing means to deactuate said power transmission means so as to prevent the transfer of any products by said ram means if the vacuum level detected by said sensing means indicates that the package section to be loaded is defective.

31. Packaging apparatus comprising a plurality of elements arranged to receive plastic packaging material to be formed into complete packages, said receiving elements being disposed serially in the form of an endless loop and mounted for simultaneous movement together around a closed path; first drive means for moving said receiving elements about said path to permit packaging operations to be carried out at selected positions along said path; means automatically operable to secure to said receiving elements respective cup-shaped product-receiving package sections moving with said elements; conveyor means for delivering groups of products to said package sections for deposit and packaging therein, said conveyor means having at least a portion thereof above said package sections to accommodate loading said groups of products downwardly into the package sections; a loading station adjacent said conveyor means to receive at least one group of said products at a time in preparation for the transfer thereof into a corresponding one of said package sections; ram means mounted above said loading station for reciprocating movement down against the products at said loading station; second drive means for accelerating said ram means smoothly towards the products at said loading station and for forcing the products from said loading station into the package section immediately below; sensing means for detecting excessive stress in said ram means which would be produced in the event said ram means encounters abnormal resistance; control means operable by said sensing means to prevent a loading movement of said ram means if said ram means encounters such abnormal resistance; and means at a position subsequent to the loading position for completing each package by securing packaging material to each package section so as to surround the group of products loaded therein and produce compact packages sealed from outside atmosphere.

32. Apparatus as claimed in claim 31, wherein said control means is effective to disable said second drive means.

33. Apparatus as claimed in claim 31, wherein said control means includes means to disconnect said second drive means from said ram means when said ram means encounters severely abnormal resistance.

34. Apparatus as claimed in claim 33, including means to prevent said ram means from interfering with the operation of said moving receiving elements in the event said ram means is disconnected from said second drive means.

35. Apparatus as claimed in claim 31, including linkage means connecting said second drive means to said ram means, said linkage means including lost-motion means operable to permit relative motion between said second drive means and said ram means in the event said ram means encounters abnormal resistance, said sensing means comprising means responsive to said relative motion.

36. Packaging apparatus comprising a plurality of elements arranged to receive plastic packaging material to be formed into packages, said receiving elements being disposed serially in the form of an endless loop and mounted for simultaneous movement together around a closed path; first drive means for moving said receiving elements about said path to permit packaging operations to be carried out at selected positions along said path; means automatically operable to secure to said receiving elements respective cup-shaped product-receiving package sections moving with said elements; conveyor means for delivering groups of products to said package sections and disposed to accomodate loading said groups of products downwardly into the package sections; a loading station adjacent said conveyor means to receive at least one group of said products at a time in preparation for the transfer thereof into a corresponding one of said package sections; ram means mounted above said loading station for reciprocating movement down against the products at said loading station; second drive means for accelerating said ram means smoothly towards the products at said loading station and for forcing the products into the package section immediately below; incremental motion producing means responsive to the operation of said first drive means independently of the operation of said second drive means, said incremental motion producing means developing a secondary movement of said ram means into each package section during a loading operation; said incremental motion producing means operating to withdraw said ram means from each package section as that package section is advanced by said first drive means away from the loading position, thereby assuring that there is no interference with the ram means; and means at a position subsequent to the loading position for completing each package by securing packaging material to each package section so as to surround the group of products loaded therein.

37. Packaging apparatus comprising a plurality of elements arranged to receive plastic packaging material to be formed into packages, said receiving elements being disposed serially in the form of an endless loop and mounted for simultaneous movement together around a closed path; first drive means for moving said receiving elements about said path to permit packaging operations to be carried out at selected positions along said path; means automatically operable at one of said positions to secure to said receiving elements respective cup-shaped product-receiving package sections moving with said elements; conveyor means for delivering groups of products to said package sections for deposit and packaging therein, said conveyor means having at least a portion thereof above said package sections to accommodate loading said groups of products downwardly into the package sections; a loading station adjacent said conveyor means to receive at least one group of said products at a time in preparation for the transfer thereof into a corresponding one of said package sections at a second position subsequent to said one position; said conveyor means including means to push the products onto said loading station; ram means mounted above said loading station for reciprocating movement down against the products at said loading station; said ram means including first and second members closely adjacent one another and both operable to contact a group of products at said loading station; means mounting said two members for movement relative to one another in a direction parallel to the movement of said conveyor means; second drive means for accelerating said ram means towards the products at said loading station and for forcing the products from said loading station into the package section immediately below; said second drive means including control means to produce said relative movement between said first and second elements during retracting movement of said ram means so as to avoid interference thereof with said conveyor push means; and means at a third position subsequent to said second position for completing each package by securing packaging material to each formed package section so as to surround the group of products loaded therein and produce compact packages.

38. Packaging apparatus comprising, in combination, a plurality of cup-shaped receptacles arranged serially in the form of an endless loop and mounted for simultaneous movement around a closed path disposed in a vertical plane; first drive means for moving said receptacles about said path to permit packaging operations to be carried out at selected positions along said path; means to secure in the cavities of said receptacles corresponding cup-shaped product-receiving package sections of formable plastic sheet closely conforming to the outlines of the respective cavity; conveyor means for delivering groups of products to said receptacles for deposit and packaging therein, said conveyor means comprising endless support means moving in a closed path and having at least a portion thereof above the upper reaches of said loop of receptacles to accommodate loading said groups of products downwardly into the cavities of said receptacles; a loading station immediately above said upper reaches and adjacent said support means portion to receive at least one group of said products in preparation for the transfer thereof into said package sections; said loading station comprising pivoted trap door means spring-loaded into product-supporting position with sufficient strength to hold the products against the force of gravity prior to the loading operation; ram means mounted above said loading station for reciprocating movement down against the products resting on said trap door means; second drive means for accelerating said ram means smoothly towards the products on said trap door means and for forcing the products through and into a waiting receptacle by pressing open said trap door means against the spring-loading thereof; said drive means being operable to move said ram means at an accelerated velocity assuring maintenance of the orientation of the products as they pass through said trap door means and into the plastic film package section in the waiting receptacle; and means at a position subsequent to said loading station to complete each package by securing a cover over each group of loaded products.

References Cited by the Examiner
UNITED STATES PATENTS

| | | | |
|---|---|---|---|
| 1,436,644 | 11/22 | Bricken | 53—35 |
| 1,716,783 | 6/29 | Latimer | 53—35 |
| 1,869,457 | 8/32 | Benoit | 53—247 |
| 2,921,425 | 1/60 | Seval | 53—247 |
| 3,067,558 | 12/62 | Good | 53—247 X |
| 3,083,106 | 3/63 | Sloan et al. | |
| 3,089,297 | 5/63 | Craig et al. | 53—150 X |

FOREIGN PATENTS 595,061    3/60    Canada.

FRANK E. BAILEY, *Primary Examiner.*

ROBERT A. LEIGHEY, BERNARD STICKNEY, *Examiners.*